J. E. BURTON.
DRAG ATTACHMENT FOR PLOWS.
APPLICATION FILED FEB. 4, 1910.
987,856.
Patented Mar. 28, 1911.
3 SHEETS—SHEET 1.
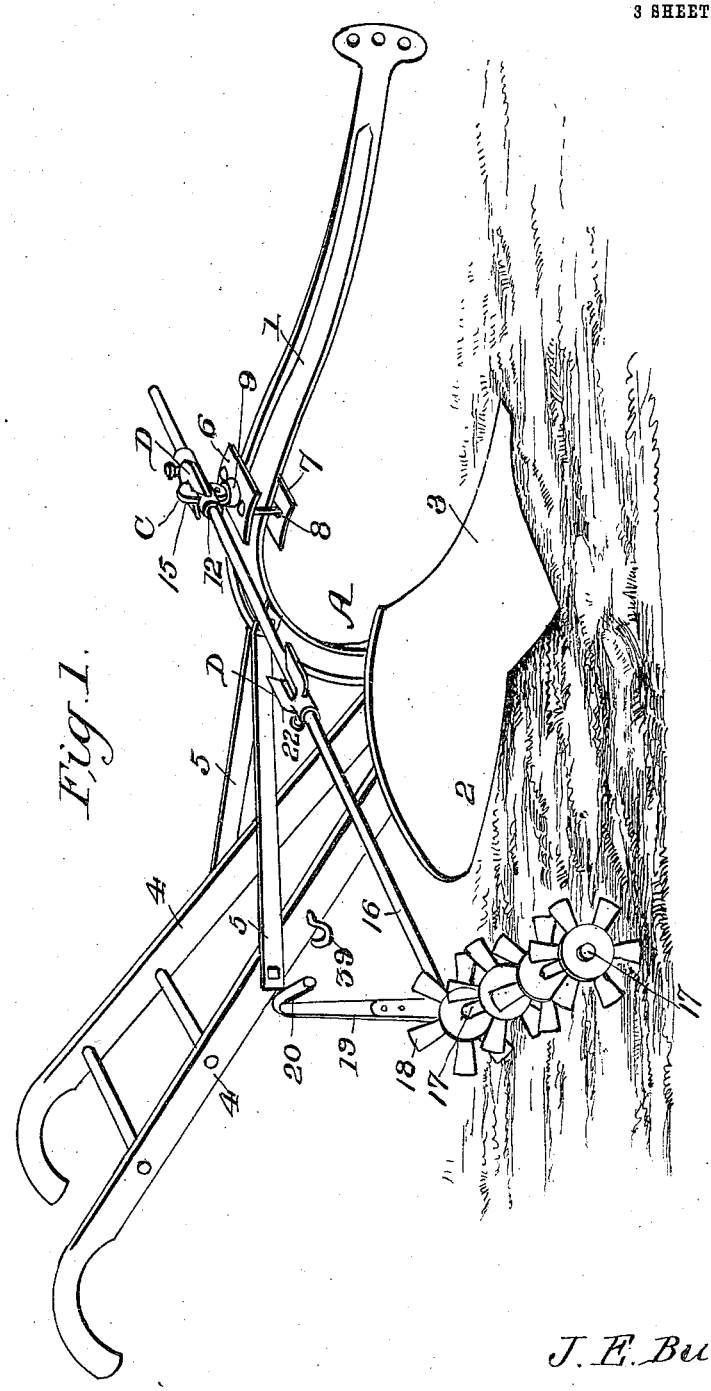
Witnesses
Inventor
J. E. Burton
By _____, Attorneys

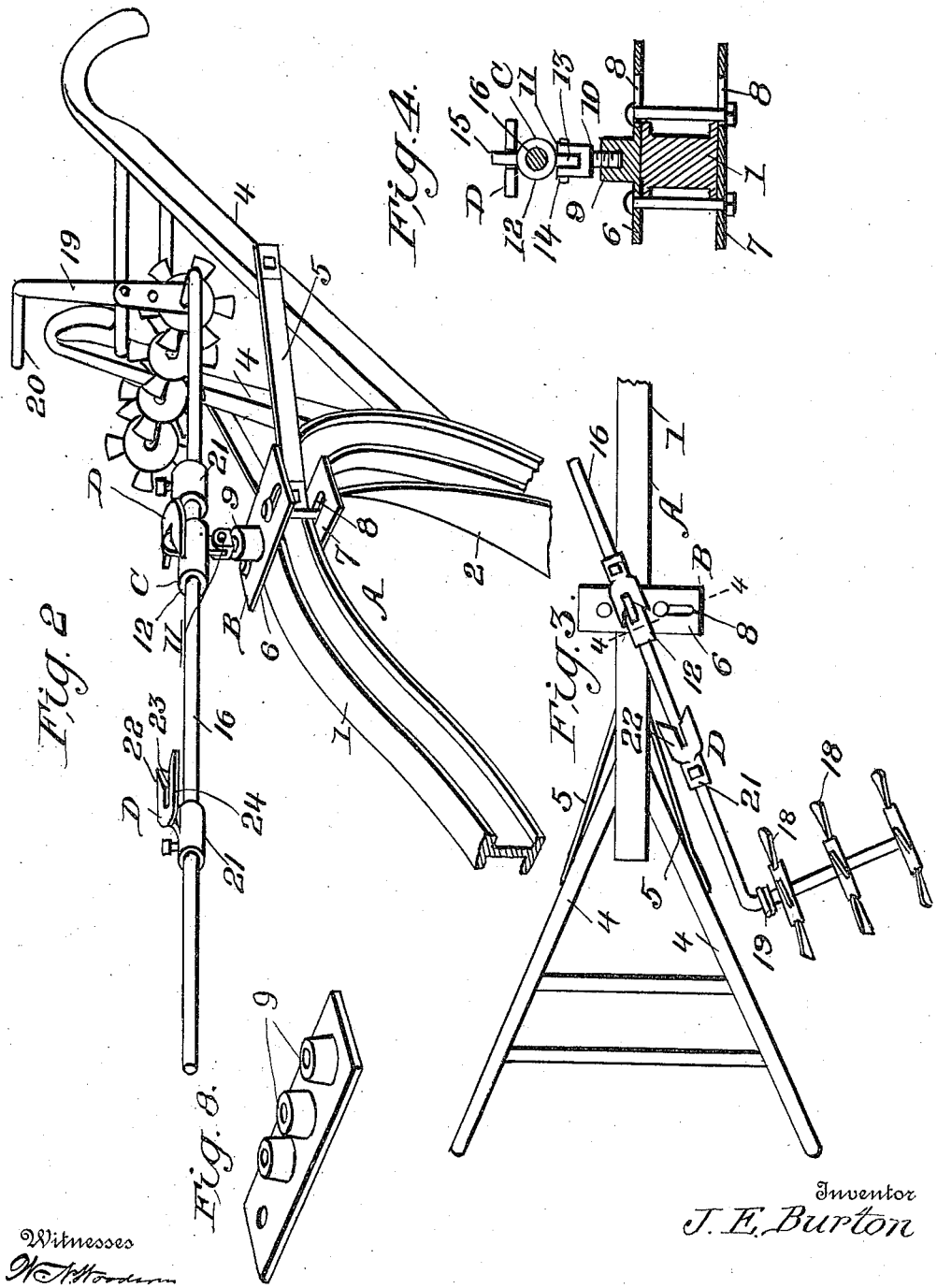

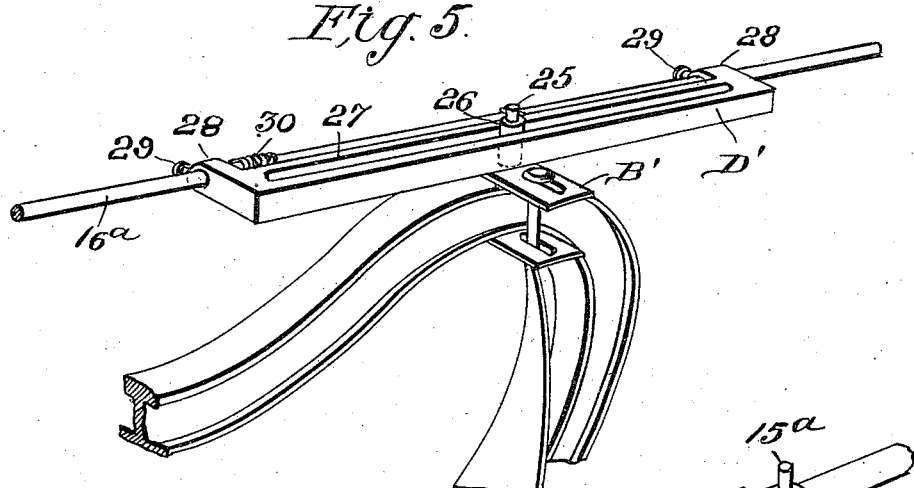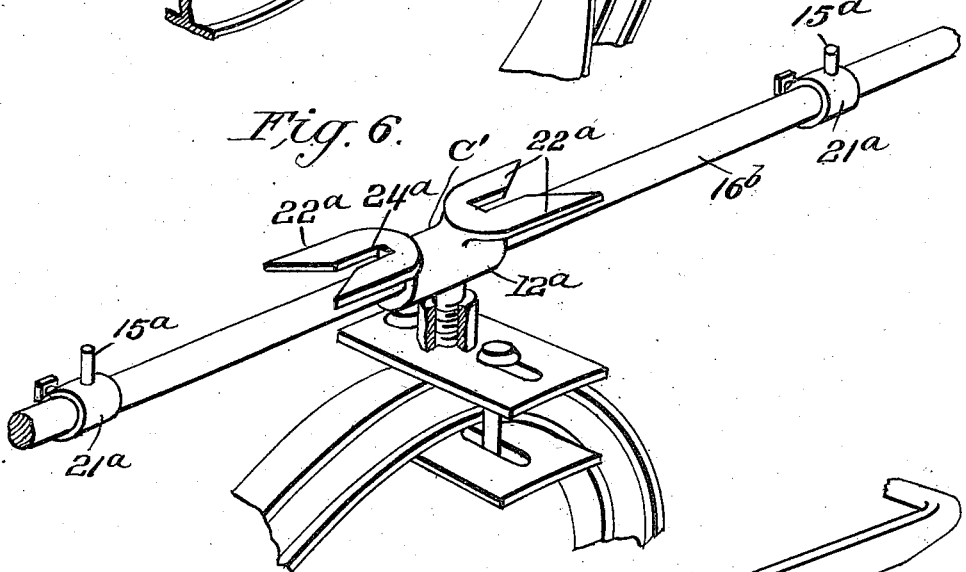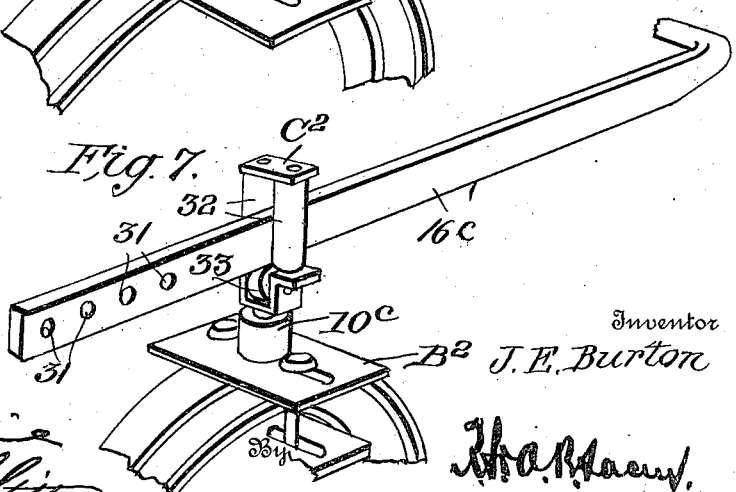

UNITED STATES PATENT OFFICE.

JAMES E. BURTON, OF WHITEWATER, WISCONSIN.

DRAG ATTACHMENT FOR PLOWS.

987,856.    Specification of Letters Patent.    Patented Mar. 28, 1911.

Application filed February 4, 1910. Serial No. 542,138.

*To all whom it may concern:*

Be it known that I, JAMES E. BURTON, citizen of the United States, residing at Whitewater, in the county of Walworth and State of Wisconsin, have invented certain new and useful Improvements in Drag Attachments for Plows, of which the following is a specification.

This invention comprehends certain new and useful improvements in drag attachments particularly for walking plows.

As is well known, the matter of providing a harrow or similar attachment for walking plows is rendered difficult owing to the fact that in the act of turning corners, it is customary at such times to tilt the plow over on the share and allow it to circle around in that position. Ordinarily the harrow as heretofore arranged being hung up at the side of the plow handles at such time, permits the plow to be only partially tilted and also in deep plowing practically admits of no tilting at all, the operator in such case being compelled to bear down on the handles to hold the point of the plow out of the ground, allowing the plow in this position to slide around on the heel or rear part of the landside. Furthermore, as is evident with such constructions, the plow is unbalanced at all times when the harrow is in an elevated position.

The primary object of my invention is to entirely overcome the difficulties and disadvantages above mentioned, and to this end, the invention consists essentially in a drag attachment for plows which when raised from the ground may be moved forwardly past the high points of the handles and at the same time carried inwardly, the pulverizer, harrow or the like being rested at any point between the handles back of the beam where it is securely held in position, thereby allowing the operator to throw the plow to turn onto the edge of the share or even completely on its side, without any danger of disengaging the harrow and without the harrow interfering.

The invention also consists in a drag attachment for plows embodying a supporting rod or lever so connected to the plow, as for instance, the beam thereof, that the harrow or the like will be held in a horizontal position no matter whether the lever be moved forwardly to an inoperative position or backwardly to a position where the harrow or similar attachment will be in an operative relation to the ground. And the invention also consists in certain constructions, arrangements and combinations of the parts that I shall hereinafter fully describe and claim.

For a full understanding of the invention, reference is to be had to the following description and accompanying drawings in which:

Figure 1 is a perspective view showing one embodiment of my invention in an operative position; Fig. 2 is a similar view of a drag device in an inoperative position, portions of the plow structure being omitted; Fig. 3 is a top plan view of the device; Fig. 4 is a transverse sectional view, the section being taken on the line 4—4 of Fig 3. Fig. 5 is a perspective view of a portion of a plow and a portion of a modified form of the invention applied thereto; Figs. 6 and 7 are similar views of other modifications; Fig 8 is a detail perspective view of a modified form of clip plate which may be employed.

Corresponding and like parts are referred to in the following description and indicated in all the views of the accompanying drawings by the same reference characters.

Referring to the drawing and now particularly to Fig. 1, the letter A designates a walking plow which may be of any ordinary or conventional type or design either a right hand or left hand plow, as my invention is applicable to both. In the plow which is selected for the purpose of illustration, 1 designates the beam, 2 the moldboard, 3 the share, 4 the rearwardly diverging handles, and 5 the braces which assist in connecting the handles to the beam.

B designates one form of clamp which may be employed. This clamp comprises an upper plate 6 and a lower plate 7 designed to be applied to the top and bottom edges of the beam at any desired point in the length of the latter, said plates 6 and 7 extending transversely as shown and being formed at one end with corresponding bolt holes and at the opposite ends with corresponding transversely extended slots 8, the bolts as shown being received in the corresponding holes and slots to secure the clamp or clip B to the plow beam. Manifestly the slots 8 provide for the application of the device to beams of different thicknesses and by using bolts of different lengths, the clip may be easily adapted for use in connection with plow beams of different widths vertically considered. The upper plate 6 is formed with a boss 9 in which a screw threaded socket is formed said socket being designed for accommodation of the threaded shank 10 of a forked bracket 11 which forms part of a lever support C. In addition to the bracket 11 with its threaded stem 10, the lever support C embodies a sleeve 12, said sleeve being formed with a downwardly projecting lug 13 pivotally mounted between the fork members of the bracket 11 as indicated at 14, said sleeve being also provided with an upwardly projecting lug or stop member 15 for a purpose to be hereinafter described. 16 designates the drag supporting rod or lever, which may be of any desired size and either round or flat. In that embodiment of the invention illustrated in Fig. 1 now being described, in connection with its correlated views, the drag supporting rod or lever 16 is round and is mounted to move, that is, slide longitudinally within the sleeve 12. The rear end of the lever 16 is extended outwardly as indicated at 17, such outwardly extending rear end constituting a horizontal axis for the drag attachment which may be of any desired character, as for instance, a rotary toothed pulverizer, as indicated at 18. This drag device may be mounted on the lever in any desired way so as to be stationary thereon, or permitted to rotate as desired. Preferably, there is secured to the rear end of the lever 16 at the juncture of the main portion thereof with the laterally extending portion, an outwardly extending handle 19, the upper end of which is deflected outwardly as indicated at 20 to form a hand grasp for manipulating the device. The outward deflection of the hand grasp 20 serves to balance the drag device and also avoids any liability of being in the way by striking the adjacent plow handle when the drag device is in operative position, or is being brought from such position to an inoperative position resting upon the handles 4.

In order to limit the movement of the lever 16 in a longitudinal direction in its supporting collar 12, I may employ in connection with the stop lug 15, two stop members D which embody collars 21 by which they may be slipped over the lever at the front and at the rear respectively of the lever support C, being held at the desired adjustment on the lever by set screws which work through the collars 21 and impinge against the lever. In addition to the collars 21, the stop members D comprise outwardly and forwardly extending jaws 22, the inner or opposing edges of which are oppositely inclined as indicated at 23 and lead into a socket 24 designed to accommodate the stop lug 15 in the different positions of the lever 16 longitudinally considered.

In describing the practical operation of this embodiment of my invention, it will be understood that the threads of the shank 10 are sufficient to permit a turning movement of the shank and consequently a turning movement of the lever about the shank as an axis while the hinged connection between the bracket 11 and the sleeve 12 will permit the lever to be tilted as well as slipped forwardly and backwardly in the sleeve. With this understanding, then, it will be noted that in the lowered and operative position of the drag device 18, the foremost stop member D will engage the stop lug 15, the latter resting in the notch 24 of such stop member and the drag device will be pulled forwardly as the plow is drawn forwardly. If the drag device be a rotary one, it is obvious that it will assume the ordinary inclined or angular relation to the beam and if it be stationary, it is clear that it may be secured in place to prevent any side draft, as for instance by the device illustrated in my prior Letters Patent of the United States #935,739 granted to me October 5, 1909. In order to move the drag device to an elevated inoperative position, it is only necessary for the operator to grasp the handle 20 and to tilt the lever 16 at the same time moving the lever forwardly until the drag device has passed forwardly beyond the high point of the handles whereupon the drag device may be pulled inwardly and rested securely on the handles with the stop lug 15 engaged in the socket 24 of the rearmost stop member D. It will then be possible for the operator to easily turn the plow on the share and to tilt it sidewise as far as necessary, and the plow will be at all times balanced when the drag device is in the elevated position just described.

It is to be understood that my invention is not limited to that construction and arrangement of the parts illustrated in Fig. 1, but that various changes and modifications may be made within the purview of the invention as defined by the appended claims. For example, reference is to be had to Fig. 5 which illustrates a modification in which, in effect the two stop members D, are bolted together to form an integral structure. In this modification, the clip designated B' is secured to the beam of a plow as shown, and a pin 25 projects upwardly from the upper plate of the clamp, an anti-friction roller 26 is mounted on the pin 25 and is received within a longitudinally extending slot 27 formed in an elongated stop member D'. The stop member D' is formed at its ends with laterally extending tapered projections 28 by which it is slipped on the bracket supporting rod 16$^a$ being secured thereon by set screws 29 as shown. It will thus be seen that the drag supporting lever is mounted for a longitudinal movement on the clamp B' which in this instance constitutes a lever support, the movement being guided by the turning of the roller 26 in the slot 27 and being limited by the abutment against either end of the stop member D'. If desired, a buffer, either of rubber or spring formation as indicated at 30 may be mounted in one end of the slot 27, preferably at the forward end, so as to absorb the shock when the lever 16ᵃ is drawn rearwardly to permit the drag device to rest on the ground. The operation of this device will be apparent from the foregoing description in connection with the drawings.

For another modification of the device, in which a reversal of the first form is shown, reference is to be had to Fig. 6, wherein is illustrated a drag supporting lever 16ᵇ which is mounted for a longitudinal sliding movement in a sleeve 12ᵃ arranged to tilt and turn like the sleeve 12. In this form of the invention, the sleeve 12ᵃ is formed with the jaws 22ᵃ which are substantially like the jaws 22 and with oppositely extending sockets 24ᵃ substantially like the sockets 24. The stop lugs 15ᵃ are secured by thimbles 21ᵃ and set screws as shown to the lever 16ᵇ both in front of and at the rear of the supporting member C' just described. As the operation of this form of the device is substantially like that first described, no further description of the operation is deemed necessary.

As a further modification of the device and the connection between the drag supporting lever and its support which permits the lever to tilt, turn and slide forwardly and rearwardly, reference is to be had to Fig. 7 wherein it will be seen that the lever designated 16ᶜ is flat instead of round and is mounted within a lever support C² and this lever support is provided with a threaded shank 10ᶜ by which it is secured to and mounted to turn slightly in the clamp B² which is secured to the plow beam, the lever being so proportioned with respect to the sleeve of the support that it may be tilted to the desired extent as well as slipped forwardly and backwardly therein. In this embodiment of the invention, the lever is formed at its forward end with a plurality of transversely extending apertures 31 any one of which may receive a pin to abut against the front side of the support C² and effect the rearward movement of the lever in said support. If desired, antifriction devices may be embodied in the support C². In the present instance, these comprise side rollers 32 and a bottom roller 33.

If desired, a short hook, as 39, may be secured to one of the handles of the plow just back of the mold-board as indicated in Fig. 1 so that the harrow may be held in a partially elevated position whenever desired, as when passing over a stretch which is not intended to be worked.

From the foregoing description in connection with the accompanying drawings, it will be seen that I have provided an improved drag attachment for walking plows, the construction and arrangement of which will provide that the plow shall be balanced at all times with the harrow or other drag device in inoperative or fully elevated position; in which no attachments are necessary to suspend the drag device from one side of the handle end of the plow to hold the drag in an elevated position; in which the harrow is at all times held in a horizontal position; and in which, by providing a rest for the harrow after an elevating movement of its supporting lever, all attachments for securing the harrow upon the handles in an inoperative position are done away with. Furthermore, as these accessories for securing the harrow directly to the handles are done away with, the harrow may be placed in an operative position as near as desired to the handles and side draft is effectively avoided. It is to be understood that the device may be used with rotary or spike toothed harrows, or with any other smoothing or leveling appliance.

As best seen in Fig. 8, the uppermost plate of the clip may be formed with any desired number of interiorly threaded bosses 9ˣ designed for detachable connection with the lever or track rod support, in order that means may be provided for the setting of the rotary or rigid toothed harrow at any desired angle to the plow. In the case of a spiked toothed harrow being used, the lever may be so adjusted by moving it outwardly at its front end that the harrow may be drawn at right angles to the plow or furrow.

Having thus described the invention, what is claimed as new is:—

1. The combination with a plow embodying a beam, and handles, of a lever fulcrumed on the plow and movable upwardly and forwardly from a point at the rear of the handles and also movable inwardly, that is, from a point near one side of the handles to a point directly over the handles in the upper and forward position of the lever, and a drag device connected to said lever.

2. The combination with a plow embodying a beam of a lever fulcrumed on the plow and mounted to tilt thereon as well as to move forwardly in a direction in line with the length of the beam and also movable laterally in a direction at right angles to the length of the beam and a drag device connected to the lever.

3. The combination with a plow embodying a beam, of a lever fulcrumed on said beam and movable in a direction in line with the beam, as well as up and down and sidewise, a drag device connected to said lever, and a handle connected to said lever and projecting outwardly over the drag device.

4. The combination with a plow, of a sleeve connected thereto and formed with oppositely facing sockets, a lever mounted for a longitudinal slidable movement in said sleeve and provided with stop lugs adapted to enter said sockets and a drag device connected to said lever.

5. The combination with a plow of a sleeve connected thereto and formed with oppositely facing jaws and sockets, a lever mounted for a longitudinally sliding movement in the sleeve, and thimbles connected to said lever and provided with stop lugs adapted to enter the jaws and be received in said sockets in the longitudinal movement of the lever in one direction or the other, and a drag device connected to said lever.

In testimony whereof I affix my signature in presence of two witnesses.

JAMES E. BURTON. [L. S.]

Witnesses:
T. M. BLACKMAN,
E. F. THUYSON.

Copies of this patent may be obtained for five cents each, by addressing the "Commissioner of Patents Washington, D. C."